Figure 1:
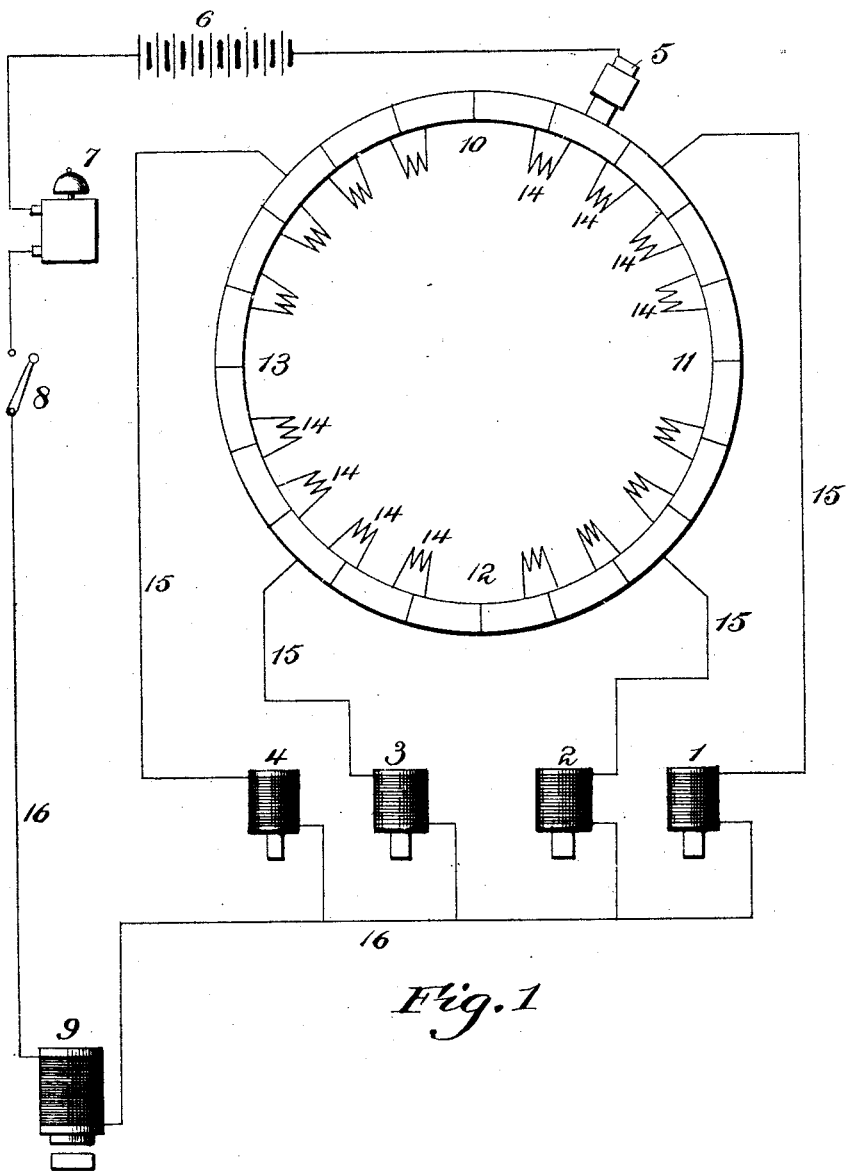

(No Model.)  6 Sheets—Sheet 1.

F. L. DYER.
ELECTRIC STEERING GEAR.

No. 515,286.  Patented Feb. 20, 1894.

Witnesses:
J. B. McGirr.
H. D. Orr.

Inventor:
Frank L. Dyer

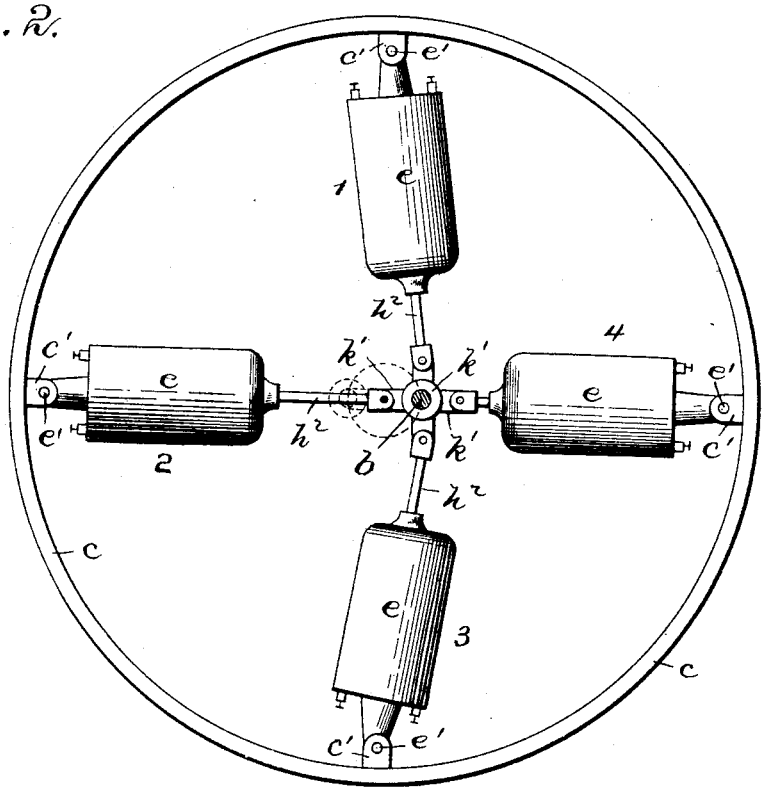
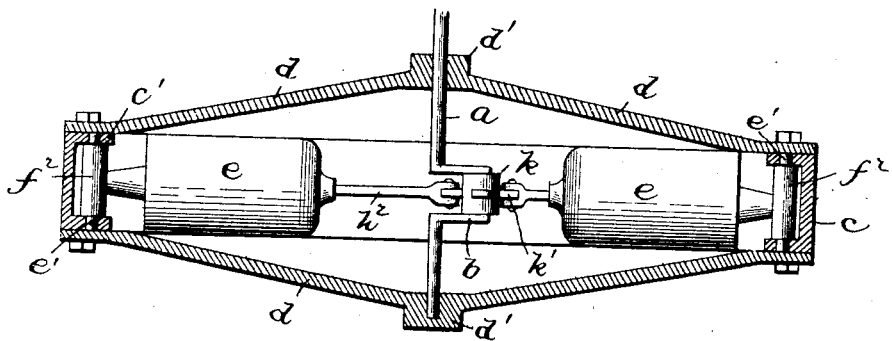

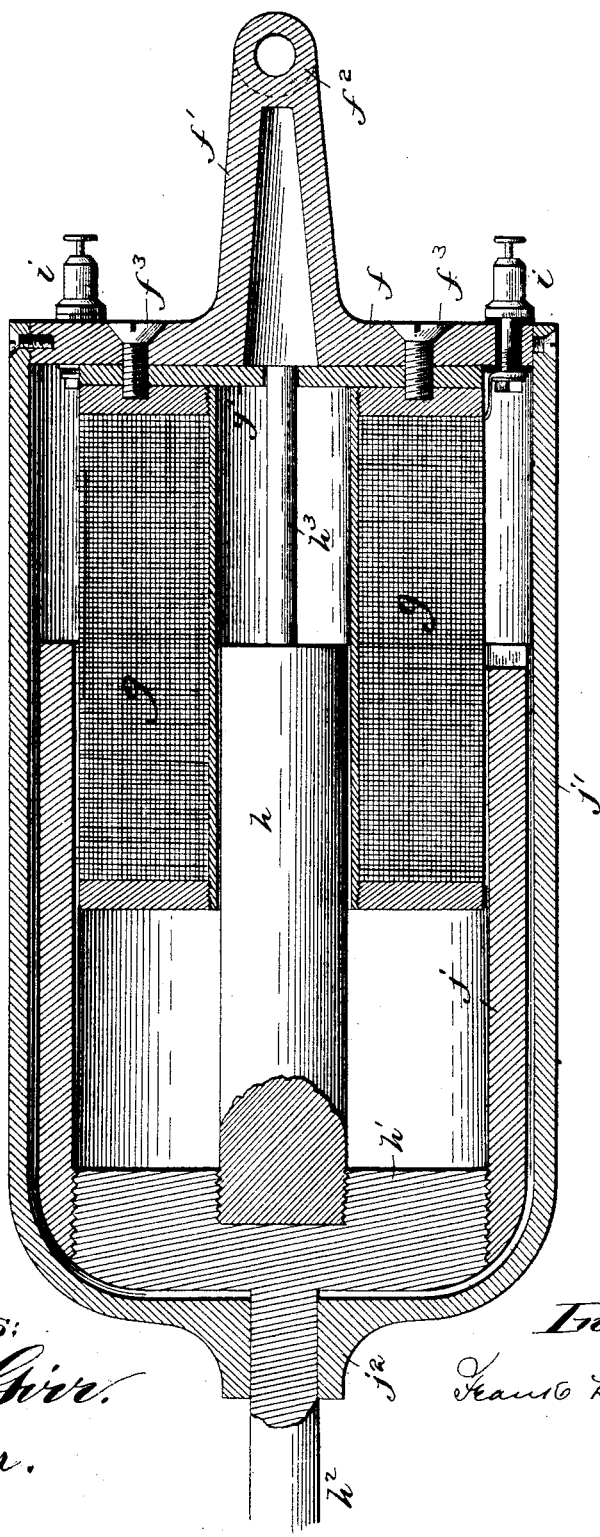

(No Model.)  6 Sheets—Sheet 4.
F. L. DYER.
ELECTRIC STEERING GEAR.

No. 515,286.  Patented Feb. 20, 1894.

Witnesses:
J. B. McGinn.
H. D. Orr.

Inventor,
Frank L. Dyer.

(No Model.) 6 Sheets—Sheet 5.

F. L. DYER.
ELECTRIC STEERING GEAR.

No. 515,286. Patented Feb. 20, 1894.

Witnesses:
J. B. McGirr.
H. D. Orr.

Inventor.
Frank L. Dyer (No Model.) 6 Sheets—Sheet 6.
F. L. DYER.
ELECTRIC STEERING GEAR.
No. 515,286. Patented Feb. 20, 1894.
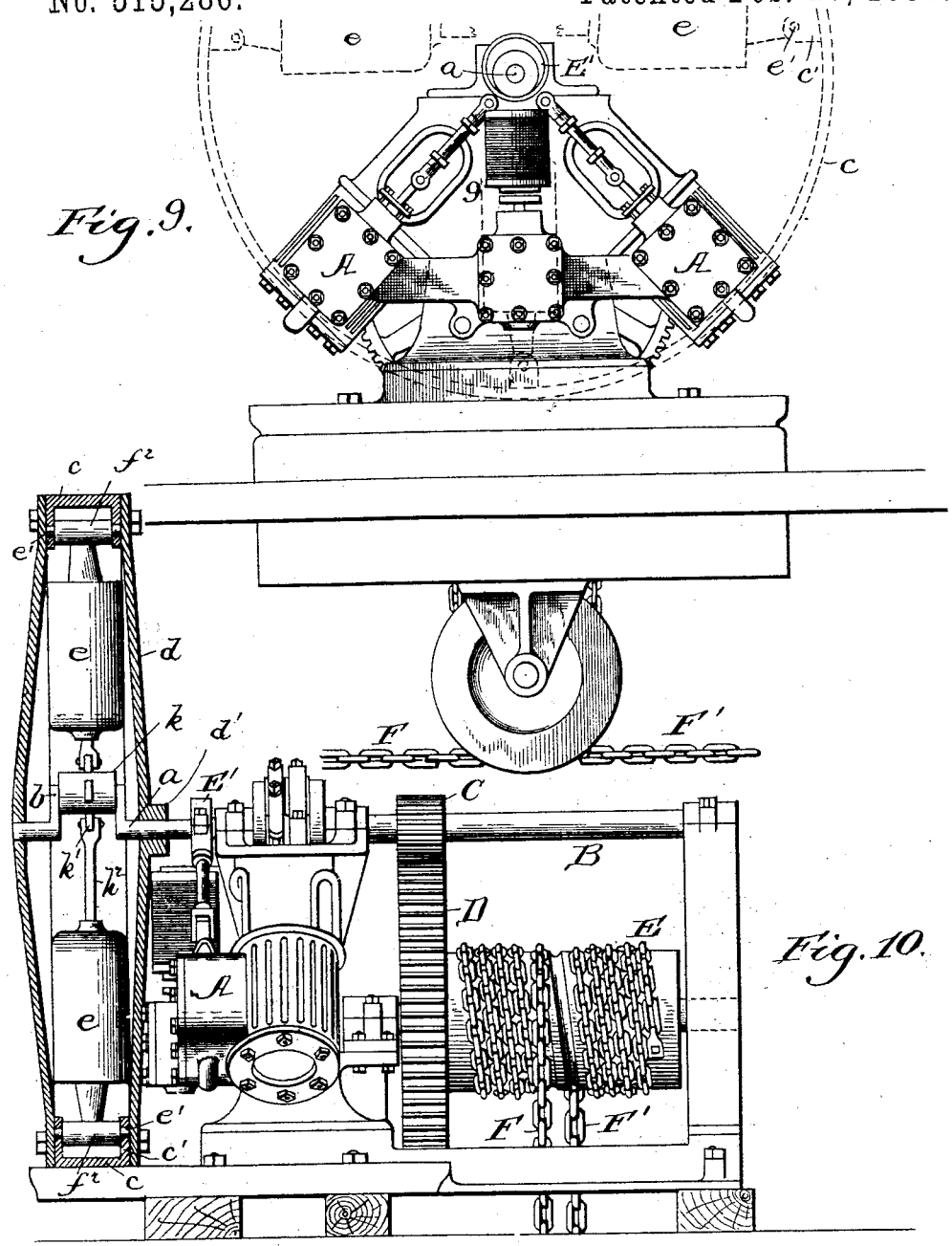
Fig. 9.
Fig. 10.
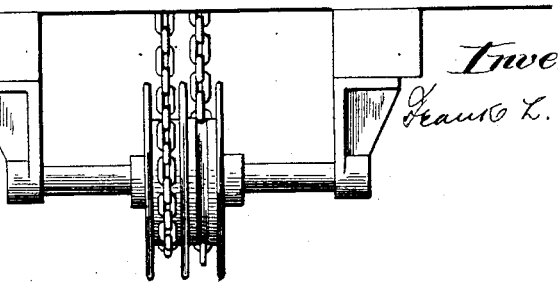
Witnesses:
J. B. McGirr
H. D. Orr
Inventor:
Frank L. Dyer
THE NATIONAL LITHOGRAPHING COMPANY,
WASHINGTON, D. C.

UNITED STATES PATENT OFFICE.

FRANK L. DYER, OF WASHINGTON, DISTRICT OF COLUMBIA, ASSIGNOR OF TWO-THIRDS TO LEONARD H. DYER, OF SAME PLACE, AND ALEXANDER McDOUGALL, OF DULUTH, MINNESOTA.

ELECTRIC STEERING-GEAR.

SPECIFICATION forming part of Letters Patent No. 515,286, dated February 20, 1894.

Application filed April 17, 1893. Serial No. 470,613. (No model.)

*To all whom it may concern:*

Be it known that I, FRANK L. DYER, a citizen of the United States, residing at Washington, in the District of Columbia, have invented certain new and useful Improvements in Electric Steering-Gear; and I do hereby declare the following to be a full, clear, and exact description of the invention, which will enable others skilled in the art to which it appertains to make and use the same.

In an application for Letters Patent of the United States filed jointly by Leonard H. Dyer and myself, on April 18, 1891, and numbered serially 389,521, for which Letters Patent No. 498,160 were issued May 23, A. D. 1893, I described an improvement in steering gears for vessels. In that application I disclosed for the first time, so far as I am aware, the general idea of placing a steam steering engine or other source of power, designated in that application as a "prime motor" in the stern of the vessel; of connecting the valves, or equivalent parts of that engine or "prime motor," with an electric motor; and of controlling that electric motor from the pilot house or elsewhere, whereby the direction and extent of movement of the electric motor, being controlled by the steersman, the steering engine or "prime motor" would be moved accordingly, and the vessel would be steered. Prior to filing that joint application, I was aware that it had been before suggested to simply open or close the throttle valve of the steering engine, by means of electricity, but devices of that kind having been practically experimented with, were not used, because the steersman, could not determine, either as to the extent of movement of the rudder, or the speed the rudder was being moved. Vessels could not thereby be steered with any degree of steadiness, or certainty, but kept constantly swerving from one side to the other. In that joint application, I illustrated one form of device whereby the general idea might be carried out, but I did not limit or restrict the claims thereof to the same. In the present application I shall describe and claim a convenient form of apparatus by which the general principles disclosed in said joint application may be carried out.

What I seek to accomplish by means of my present invention is to place the steam steering engine of the vessel, in the stern thereof, and to control the said steam steering engine from the pilot-house, or elsewhere by electrical means, this being the same general idea disclosed in said joint application. By placing the steam steering engine of the vessel, within the stern thereof, I obtain a better device for the purpose of steering vessels, than when the steam steering engine is placed in the bow of the vessel as is now the case in ordinary steam and hand steering devices. The principal objection to placing the steam steering engine within the bow of the vessel, which is now necessary, because the engine must be connected directly with the steering wheel, is this: The steering wheel controls and operates the rudder, through the intermediate action of the steering engine, and the helmsman cannot "feel" the rudder as in direct steering. That is to say, the steering wheel operates with the same ease in heavy weather as in light weather, since all that is necessary for the helmsman to do, is to move the valves, or eccentrics of the "steam steering" engine, which action is, of course, the same, irrespective of outside influences. It often happens in heavy weather, that the rudder may be struck by a wave, at the very moment it is being put "hard over," and the rudder being entirely independent of the helmsman this fact cannot be determined by him. The steering engine, however, continues to operate, and forcing the rudder against the force of the wave, the strain imposed thereby often breaks the chains or ropes which connect the engine with the tiller, throwing the vessel completely at the mercy of the sea. It will be evident, by placing the steam steering engine in the stern of the vessel, that it may be connected directly to the tiller, or if by chains, that much shorter and stronger chains, may be used, which would not be so liable to breakages as when long chains are used, there being less friction and fewer links to break. Another advantage of placing the steam steering engine in the stern of the vessel, is that it will be much nearer the boilers of the vessel, and can be supplied with steam to better advantage. Another advantage of this construction is that it will be easier to steer the vessel, by electrical means than by steam, since all that the helmsman has to do in the former is to move a contact arm to make electric contact, whereas in steam steerers, he has to move the valves or eccentrics of the engine, which often stick and work hard. Another advantage of this construction is that the chains running from bow to stern are dispensed with, the said chains being noisy, and liable of being obstructed.

What I propose to do, in carrying out my present invention, is to place the steam steering engine in the stern of the vessel, which steam steering engine will be connected directly to the tiller in any desired way. Short chains which I shall illustrate, may connect the said engine with the tiller. This steam steering engine will receive steam from the boilers of the vessel, and will be like any other steam engine, except that the eccentric or eccentrics will not be secured to the driving shaft, but will be mounted on an independent shaft. I will connect to this independent shaft, an electrical device, which I have invented, which electrical device will be controlled from the pilot house or elsewhere. The electric current for this electrical device is to be supplied thereto preferably by a small isolated electric plant, placed in the boiler or engine room of the vessel, and operated by steam from the boilers of the vessel. When the parts are thus put up I will turn a crank or wheel, in the pilot-house, say to port, which will cause the electrical device to turn to port, thereby operating the eccentric or eccentrics of the steering engine in the same direction, which will cause the steering engine to follow the same movements, thereby turning the helm to starboard, and the rudder to port. I propose to carry these operations out by means of the mechanism, illustrated in the accompanying drawings, to which attention is now directed.

Figure 5:
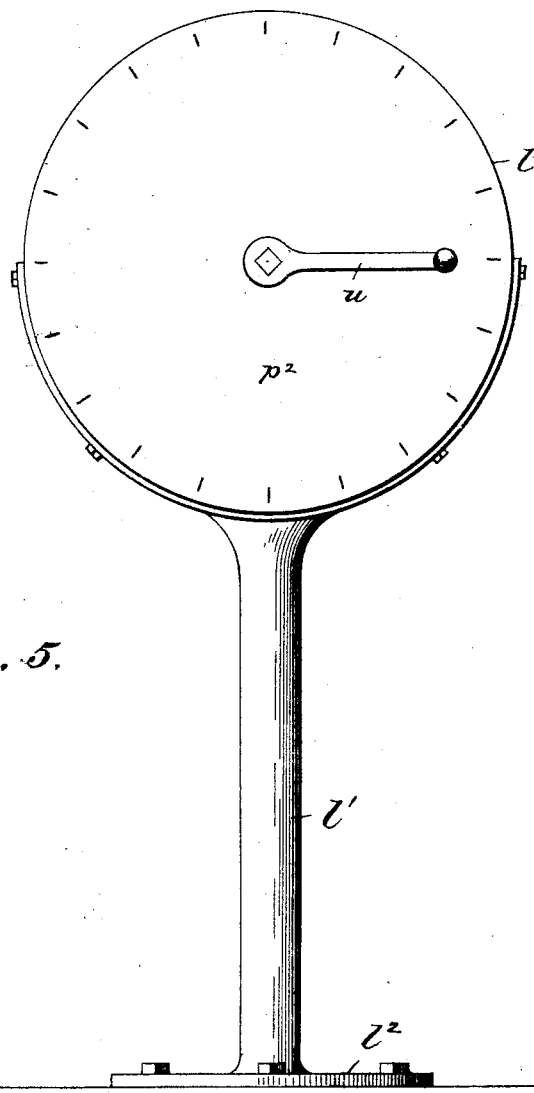
Figure 6:
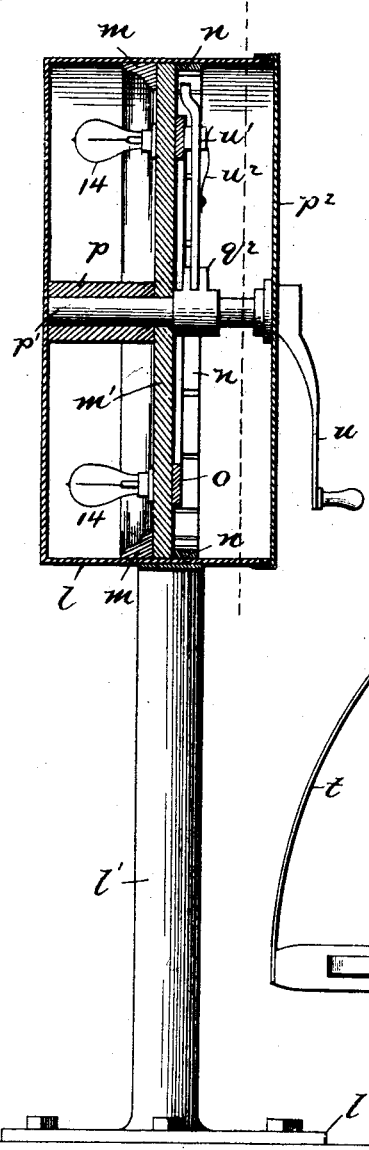
Figure 7:
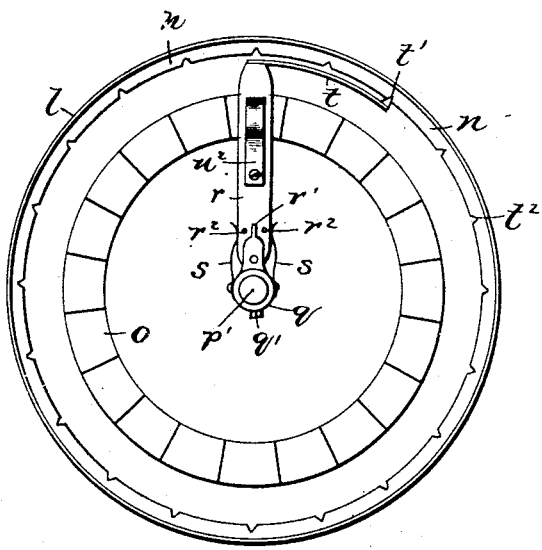
Figure 8:
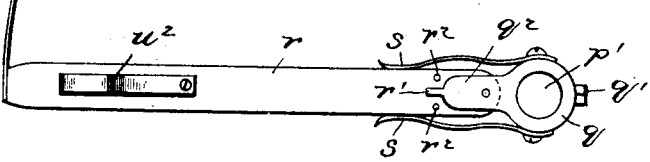

In the drawings: Figure 1, is a diagrammatic view of the electric circuits of the apparatus; Fig. 2, a side elevation, partly in section, of the electrical device for operating the eccentrics of the steam steering engine; Fig. 3, a cross section, partly in elevation of the same; Fig. 4, a section of one of the solenoids, used in the electrical device for operating the eccentrics of the steam steering engine; Fig. 5, a front elevation of the circuit controlling apparatus in the pilot house; Fig. 6, a section of the same; Fig. 7, an interior view, partly in section of the circuit controller; Fig. 8, an enlarged view of that portion of the circuit controller, employed to prevent sparking therein; Fig. 9, an end elevation of the steam steering engine, showing in dotted lines my improved electrical device for operating the eccentrics thereof, and Fig. 10, a side elevation of the steam steering engine showing in elevation, partly in section, the electrical device for operating the eccentrics thereof.

In all of the above views, corresponding parts are designated by the same letters and figures of reference.

Referring first, to Figs. 9 and 10, A. A. represent the cylinders of a well known form of steam steering engine, which is to be placed in the stern of the vessel adjacent to the tiller, and which is supplied with steam from the boilers of the vessel. The piston rods of these cylinders operate the shaft B, having a spur wheel C, thereon, which engages with the gear wheel D, and this latter gear wheel D, is connected with and operates the drum E. Extending around the drum E, in opposite directions are the two chains F and F', connecting with the tiller in any well known way. As the engine works in one direction, the drum will be revolved, so that one chain will be wound up thereon, and the other chain will be slacked off thereof, moving the tiller in one direction, as will be understood. The engine moving in the other direction, will reverse these movements of the chains, which will turn the tiller in the opposite direction.

Instead of connecting the steering engine to the tiller by means of two chains wound around a drum as I have just described, the said steering engine may be connected to the tiller either directly or indirectly by any well known mechanical means.

Instead of making use of a steam steering engine, like that illustrated in Figs. 9 and 10, having two cylinders arranged at right angles, any other steering engine may be used having any number of cylinders, or operated by compressed air, or other force.

E. is the eccentric of the steering engine, mounted on an independent shaft $a$. The eccentric strap of the engine, encircles the eccentric E. and connects with the valves in the usual way. In the engine illustrated, only one eccentric and one eccentric-strap are used, but in other engines, two or more eccentrics and eccentric-straps may be used, all of said eccentrics being either mounted upon the independent shaft $a$, or controlled by the same. The shaft $a$, is provided with a crank portion $b$. thereon, and with this crank portion $b$. engages the electrical device for controlling the eccentrics. This electrical controlling device is illustrated particularly in Figs. 2 and 3, to which attention is now directed. Broadly considered, it consists of three or more solenoids, or electro-magnets, preferably the former, arranged circumferentially around the independent shaft $a$. or around a separate shaft. The cores of these solenoids, or the armatures of the electro-magnet, if used, connect with the crank portion $b$. of the shaft $a$. The solenoids or electro-magnets are now successively energized, whereby the independent shaft will be rotated, in one direction or the other, each solenoid, or electro-magnet contributing to partially rotate the said shaft.

Referring to the mechanical construction of this electrical controlling device, $c$. represents a circular casting or rim, having ears or lugs $c'$. $c'$. cast or formed thereon, or attached thereto. Secured to each side of the casting or rim $c$ is a head $d$. inclining outwardly at its center, and each head being formed at its center with bearing boxes $d'$, for the shaft $a$. By making use of the heads $d$, the space within the rim $c$, for the reception of the solenoids, will be entirely closed and all dust will be excluded, and a very strong, light and rigid frame work will be obtained. $e$, are solenoids, four of which are shown, which are mounted within the rims so as to swing between the lugs $c'$, on pins $e'$. The construction of these solenoids will be better understood from an inspection of Fig. 4. $f$ represents the base plate of the solenoid, having an integral cylindrical projection $f'$ thereon. This projection $f'$, which is hollow, for the purpose to be hereinafter explained, is provided at its extreme outer end with a sleeve $f^2$ (see Fig. 3) through which extend the bearing pins $e'$ before referred to. The said plate $f$ and extension $f'$ are made preferably of some non-magnetic metal, such as bronze or brass, although steel may be used, if desired. Secured to the plate $f$, by means of screws $f^3$ is the coil $g$, and interposed between the coil $g$ and the under side of the plate $f$, is a bearing plate $g'$ having an opening therein in its center. The bearing plate $g'$ is made preferably of phosphor-bronze, since that metal is non-magnetic and wears well. The coil $g$, is of the usual construction, being composed of insulated wire wound upon a thin bobbin having heavy ends. $h$, is the core of the solenoid, which is screwed or otherwise secured to the cylindrical plate $h'$, having the connecting rod $h^2$ integral therewith, which connecting rod engages the crank portion of the shaft $a$, and rotates the same as I shall presently explain. The core $h$ is made preferably of soft iron. $h^3$, is a small cylindrical extension of the core $h$, which extension is made preferably of phosphor-bronze or some other non-magnetic metal, which engages within the opening in the bearing plate $g'$, so as to keep the core always centered in the coil $g$. The extension $h^2$, works in the hollow projection $f'$. The electric current is introduced into the coil $g$ by binding posts $i, i$, of the usual construction and preferably insulated from the plate $f$ in any well known way. $j$, is a sleeve of soft iron which is secured to the outside of the circular plate $h'$, and surrounds the coil $g$, working in close proximity to the outside of the coil.

The action of the solenoid will be readily understood. Upon exciting the coil $g$, the core $h$ will be attracted in the usual way and also the sleeve $j$ will be attracted by the outer layers of the coil and by the magnetic attraction of the front plate of the coil. By making use of the sleeve $j$ and the core $h$, I get the full effect of the current within the coil $g$, being able to utilize the lines of force both of the inside and of the outside of the coil. A very powerful and compact solenoid will in this way be obtained. A solenoid having a core and a sleeve broadly considered is not new in the art, and therefore I do not claim such a solenoid generically, but only such improvements therein as I have made and by means of which I obtain a solenoid better adapted for the purpose. $j'$ is a jacket, made preferably of brass, which surrounds the working parts of the solenoid, being screwed to the plate $f$ and having a bearing box $j^2$ at its lower end for the connecting rod $h^2$. $k$, is a sleeve which surrounds the crank portion $b$, of the shaft $a$, and $k'$ are lugs or ears which are formed on said sleeve. The connecting rods $h^2$ are provided at their lower ends with twin lugs which are pivoted to the ears $k'$. The operation of this electrical device will be readily understood from an inspection of Fig. 2. I have designated the solenoids in this view by the Figures 1, 2, 3, and 4. The crank portion of the shaft $a$, is in a horizontal position in this figure. When the solenoid 1 is energized, its core and sleeve will be attracted and the crank portion $b$, of the shaft $a$, will be moved into a vertical position above the shaft $a$. When the solenoid 2 is energized, the crank portion $b$ of the shaft $a$, will be thrown into the horizontal position shown in dotted lines. The solenoid 3 being now energized will give another quarter turn to the crank portion $b$, of shaft $a$, which will then be brought into a vertical position, below the shaft, and when the solenoid 4 is energized, the crank portion $b$ will be returned to its original position. It will therefore, be seen that each solenoid serves to turn the shaft $a$. one-quarter of a complete revolution, the four solenoids working in succession serving to give the shaft a full turn. In thus working, the solenoids move in their frames, like the cylinders of an ordinary oscillating steam engine. When three solenoids are used, each solenoid serves to give the shaft $a$. one-third of a turn, and so on. It might be possible to use but two solenoids, but the danger of having dead centers would make that arrangement objectionable. The means whereby this successive energizing of the solenoids will be accomplished are illustrated in Fig. 1 of the drawings, to which reference will now be made. I have illustrated the solenoids diagrammatically in this view, as before, by the figures 1, 2, 3, and 4. Directly above these solenoids is shown a circuit changer composed of a number of insulated metallic segments. 5, is a contact piece which bears upon the segments of this circuit changer; 6 is a source of electrical supply; 7 is an alarm bell in the circuit; 8 is a switch for opening and closing the circuit; and 9 is an electro-magnet in the circuit for controlling the throttle valve of the steam steering engine.

Referring to the circuit changer, I have shown the five segments from 10 to 11 for controlling the solenoid 1; the five segments from 11 to 12 for controlling the solenoid 2; the five segments from 12 to 13 for controlling the solenoid 3, and the five segments from 13 to 10 for controlling the solenoid 4. The segments of each of these series are connected together by resistances 14, 14, but are insulated from the segments of the other series, as will be understood. The connections 15 leading to the various solenoids extend out from the central segment of each series, so that the contact piece 5 before it reaches that central segment, in each series, will have to pass over two other segments of the same series.

16 is a common return for all of the solenoids, within which common return is placed the electro-magnet 9, for controlling the throttle valve of the steam steering engine. The switch 8, bell 7, and source of supply 6, shown for clearness in Fig. 1, as a battery, are also by preference placed in the return 16. The operation of this circuit changer in controlling the solenoid will be readily understood.

In Fig. 1 the contact piece 5, bears on the second segment of the series of segments from 10 to 11, and the current to the solenoid 1, will pass through one resistance coil 14. As the contact piece 5 is moved to the next segment, i. e. the central segment, there will be no resistance in the circuit to the solenoid 1, and the full current will pass through the solenoid 1. As the contact piece 5 moves to the next segment, one resistance coil will be thrown in the circuit and the current to the solenoid 1, will be diminished. Upon moving contact piece 5 to the next segment two resistance coils 14, will be thrown into the circuit to the solenoid 1, and the current will be almost entirely cut off from the same, so that when the contact piece 5 passes to the next series of segments, 11 and 12, which control the solenoid 2, there will be much less danger of sparking than when the resistances are not used. I have invented a device, however, for preventing sparking in this circuit changer, which I shall presently describe and which may be used with the resistance coils shown in Fig. 1, or without these resistance coils. In addition to the fact that the use of resistances in the circuit changer greatly diminishes sparking therein, by throwing in and taking off the current to each solenoid in a gradual manner, and in passing from one series of segments to another series, when the current is weakest, the use thereof, is also advantageous inasmuch as the full force of the current cannot be suddenly thrown into one of the solenoids, and there is for this reason much less liability of the solenoids burning out. The bell 7 which is placed in the common return circuit 16 from the solenoids is of any well known construction of electro-mechanical bell, being provided with suitable clock-work mechanism, which is adapted to ring the bell. This bell is provided with an electro-magnet therein, having an armature which is normally attracted when the circuit is complete and locks the clock-work mechanism, so that the bell will not ring. If it should happen that one of the circuits should become broken, the armature of the electro-magnet within the bell 7, being released would trip the bell mechanism thereby ringing the bell, which will give an audible notification to the steersman that the device is out of order. This bell 7 should be placed within the pilot house, or elsewhere, so as to be heard by the steersman. Bells of this type are so common, and their operation is so well understood, that I do not consider it necessary to illustrate the same in the drawings. The object of making use of this bell, is to notify the steersman that one of the circuits is broken, or that the dynamo has broken down, and I wish, therefore, to have this description to be understood as covering any variety of bell, or indicator, placed in the pilot house or elsewhere, to give an audible or visual notification that the device is out of order. If an electro-mechanical bell, such as I have above described is used, it will be obvious that it should be provided with a stop or catch therein, by which the clock-work mechanism may be prevented from operating, when the current is purposely cut off therefrom, for any purpose, as for instance, when the vessel is in port.

The mechanical construction of the improved circuit changer, is illustrated in Figs. 5, 6, 7, and 8, to which attention is now directed. $l$ is a metallic casing which is mounted on a standard $l'$, having a foot $l^2$, which is bolted or otherwise secured to the floor of the pilot house, or bridge or conning tower or elsewhere. Within the casing $l$ is a shoulder $m$, extending entirely around the same and resting on this shoulder $m$, is a heavy insulating base $m'$ made either of wood or insulating fiber. This base $m'$ is held in place against the shoulder $m$ by a steel ring $n$, secured in position by means of screws passing through the casing $l$. Secured to the insulated base $m'$ in any suitable way are the segments of the circuit changer. These segments are made of brass or copper in the well known manner, and are arranged preferably in series of five, as shown diagrammatically in Fig. 1, and as before described. 14 are the resistances shown diagrammatically in Fig. 1 and illustrated as ordinary incandescent lamps in Fig. 6. Any other form of resistance can be used however such, for instance, as coils of German silver wire. $p$ is a sleeve, which is secured to the back of the casing $l$ and which offers a support for the insulated base $m'$. This sleeve also supports a shaft $p'$, which extends out through the insulated base $m'$ and bears within the front $p^2$ of the casing $l$.

This shaft $p'$ is provided with a collar $q$ thereon (see Fig. 8) which collar is held rigidly in position on the shaft $p'$ by a set screw $q'$. The sleeve $q$ is provided with lugs $q^2$ thereon arranged one above the other, and pivoted within these lugs $q^2$ is a contact arm $r$, made preferably of metal. The upper lug $q^2$ is provided with a small projection $r'$ thereon adapted to engage with one or the other of the studs $r^2$ which are secured to the contact arm $r$. The contact arm $r$ is normally held in a position whereby the studs $r^2$ will be equi-distant from the projection $r'$ by means of leaf springs $s, s$, secured to the sleeve $q$. At the outer end of the contact arm $r$ is a leaf spring $t$, having a stud or tooth $t'$ at its extreme end. This stud or tooth bears with considerable friction against the steel ring $n$, which ring is provided with notches $t^2$, so arranged that when the tooth $t'$ engages with one of the notches the contact arm $r$, will be directly over one of the segments of the circuit changer. $u$, is a crank which is secured to the end of the shaft $p'$ and by means of which the said shaft is rotated. $u'$, is a contact piece working in the slot in the contact arm $r$ and held in engagement with the segments of the circuit changer by a leaf spring $u^2$. This contact piece is made preferably of hard carbon or copper, and it will be always held with a good contact against the segments of the circuit changer, by the spring $u^2$ irrespective of wear. The operation of this circuit changer will be readily understood when taken in connection with the description before given of the diagrammatical view shown in Fig. 1. The tooth $t'$ will engage with one of the notches in the ring $n$, and the contact piece $u'$ will rest directly upon one of the segments of the circuit changer. When the crank $u$ is turned the contact arm will be temporarily locked by the stud $t'$ engaging one of the notches $t^2$, until the projection $r'$ on the ear $q^2$ engages with one of the studs $r^2$, which movement will place one or the other of the springs $s$, under tension. As soon however as the projection $r'$ engages with one of the studs $r^2$ there will be no elasticity and the contact arm $r$, will be moved, causing the tooth $t'$ to be thrown out of the notch $t^2$, into which it is engaged. The spring $s$, which was under tension will now throw the contact arm forward until the tooth $t'$ engages with the next notch. By this means, it will be understood the contact piece $u'$ will be thrown quickly from one segment to another and it will always rest upon one segment, whereby sparking will be almost entirely overcome.

Unless otherwise specified in my claims, I desire to have the elements of my device construed, in the following sense: A solenoid means either a solenoid, so called, or an electro magnet. A circuit changer, means a device for controlling the direction of the electric-motor, and for starting and stopping the same. A steam steering engine, means any engine or motor for operating the rudder.

The word "controlled" as specifying the function of the electric motor, means to start, to stop, and to vary the direction and extent of movement of the steering engine.

What I claim is—

1. In an electric steering gear, the combination of a steam steering engine, placed in the stern of a vessel, and connecting with the rudder; an independent eccentric or eccentrics for said steam steering engine; two or more solenoids, the cores of which connect with said eccentric or eccentrics, and electric connections from the bow of the vessel, for successively energizing said solenoids whereby the said eccentric or eccentrics will be rotated in one direction or the other, substantially as set forth.

2. In an electric steering gear, the combination of a steam steering engine, placed in the stern of a vessel, and connecting with the rudder; an independent eccentric or eccentrics, for said steam steering engine; two or more solenoids the cores of which connect with said eccentric or eccentrics, and mounted circumferentially around said eccentric or eccentrics; and electric connections from the bow of the vessel, for successively energizing said solenoids, whereby the said eccentric or eccentrics will be rotated in one direction or the other, substantially as set forth.

3. In an electric steering gear, the combination with a steam steering engine, placed in the stern of a vessel; and an independent eccentric or eccentrics for said steam steering engine; of two or more solenoids, arranged circumferentially around said eccentric or eccentrics, and with the cores of said solenoids, connecting with said eccentric or eccentrics; a circuit changer in the bow of the vessel; a separate connection from said circuit changer to each of said solenoids; and a common return for all of the solenoids, substantially as set forth.

4. In an electric steering gear, the combination with a steam steering engine, placed in the stern of the vessel and connecting with the rudder; and an independent eccentric or eccentrics for said steam steering engine; of two or more solenoids, the cores of which connect with said eccentric or eccentrics; a circuit changer in the bow of the vessel; a separate connection from said circuit changer, to each of said solenoids; a common return for all of the solenoids; and a signal device in said return circuit, substantially as set forth.

5. In an electric steering gear, the combination with a steam steering engine placed in the stern of a vessel and connected with the rudder; of an electric motor connected with and controlling the valves or equivalent parts of said steam steering engine, whereby the said steam steering engine will be controlled by said electric motor; a circuit controller in the bow of the vessel; circuits from said circuit controller to said electric motor; and a signal device in one of said circuits, substantially as set forth.

6. In an electric steering gear, the combination with a steam steering engine, placed in the stern of a vessel and connected with the rudder; of an electric motor connected with and controlling the eccentric or eccentrics of said steam steering engine, whereby the said steam steering engine will be controlled by said electric motor; a circuit controller in the bow of the vessel; circuits from said circuit controller to said electric motor; and an electro-magnet in one of said circuits, for controlling the throttle valve of said steam steering engine, substantially as set forth.

7. In an electric steering gear, the combination with a steam steering engine, placed on the stern of the vessel, and connected with the rudder; and an independent eccentric or eccentrics for said engine; of two or more solenoids mounted circumferentially around said eccentric or eccentrics in a closed casing with the cores of said solenoids connected with said eccentric or eccentrics; a circuit controller in the bow of the vessel, and circuits from said circuit controller to said solenoids, substantially as set forth.

8. In an electric steering gear, the combination with a steam steering engine, placed in the stern of the vessel; and connected with the rudder; and an independent eccentric or eccentrics for said engine; of two or more solenoids mounted circumferentially around said eccentric or eccentrics and swinging within a closed casing, with the cores of said solenoids connected with said eccentric or eccentrics; a circuit controller in the bow of the vessel; and circuits from said circuit controller to said solenoids, substantially as set forth.

9. In an electric steering gear, the combination with a steam steering engine, of an electric device for controlling or governing the valves thereof, said electrical device, consisting of a plurality of solenoids the cores of which connect with said valves; and a controller for said solenoids, substantially as set forth.

10. In an electric steering gear, the combination with a steam steering engine; of an electric device for controlling or governing the valves thereof, said electrical device, consisting of a plurality of solenoids, the cores of which connect with said valves; and a controller for sucessively energizing said solenoids, substantially as set forth.

11. In an electric steering gear, the combination with a steam steering engine; of an electrical device, for controlling or governing the valves thereof, consisting of a plurality of solenoids, mounted so as to swing in a closed casing; and with the cores of said solenoids, connected with the said valves of said steam steering engine; and a circuit controller, for controlling said solenoids, substantially as described.

12. In an electric steering gear, the combination with a steam steering engine; of an electrical device, for controlling or governing the valves thereof, consisting of a plurality of solenoids, with the cores of said solenoids connected with the valves of said steering engine; a circuit controller, in the bow of the vessel; circuits from said circuit controller to the said solenoids; a contact arm, in electrical contact with said circuit controller; and a common return, from said solenoids to said contact arm, substantially as set forth.

13. In an electric steering gear, the combination with a steam steering engine; of an electrical device, for controlling or governing the valves of said steam steering engine; consisting of a plurality of solenoids, with the cores of said solenoids, connected with the said valves; a circuit controller, in the bow of the vessel; circuits from said circuit controller to the said solenoids; a contact arm, in electrical contact with said circuit controller; a common return from said solenoids to said contact arm; and a signal device in said common return, substantially as set forth.

14. In an electric steering gear, the combination with a steam steering engine, of an electrical device, for controlling or governing the valves of said steam steering engine consisting of a plurality of solenoids, with the cores of said solenoids connected with the said valves; a circuit controller in the bow of the vessel; circuits from said circuit controller to the said solenoids; a contact arm, in electrical contact with said circuit controller; a common return, from said solenoids to said contact arm; and an electro-magnet in said common return, the armature of which is connected to and operates the throttle valve of the steam steering engine, substantially as set forth.

15. In an electric steering gear, the combination with a steam steering engine, of an electric motor, connected with the eccentric valves of said steam steering engine; and an electro-magnet, the armature of which connects with and operates the throttle-valve of said steam steering engine, substantially as set forth.

16. In an electric steering gear; the combination with a steam steering engine; of an electric motor, connected with the eccentric valves of said steam steering engine; and an electro-magnet, the armature of which connects with and operates, the throttle valve of said steam steering engine, said electro-magnet being in circuit with said electric motor, substantially as set forth.

17. An improved solenoid, consisting of a coil; a core, of magnetic metal, having reciprocating motion in said coil; a connecting rod, connected to and operated by said core; a sleeve, of magnetic metal having reciprocating motion outside of said coil, and connected with said connecting rod; a jacket, surrounding said coil, and the working parts of the solenoid; and a bearing box in said jacket for said connecting rod, substantially as set forth.

18. An improved solenoid, consisting of a base $f$; a hollow cylindrical extension $f'$, on said base; a coil $g$ secured to said base; a bearing plate $g'$, interposed between said coil and said base; and a core $h$, of magnetic metal, having reciprocating motion in said coil, and provided with a stem $h^3$ working in said bearing plate $g'$, substantially as set forth.

19. An improved solenoid, consisting of a base $f$; a hollow cylindrical extension $f'$, on said base; a coil $g$ secured to said base; a bearing plate $g'$, interposed between said coil and said base; a plate $h'$, working in front of said coil; a connecting rod $h^2$, connected with said plate $h'$; a core $h$, connected with plate $h'$, and having reciprocating motion in said coil; a stem $h^3$ on said core, working in said bearing plate $g'$; a sleeve $j'$, of magnetic metal, secured to said plate $h'$, and having reciprocating motion outside of said coil; a jacket $j''$; secured to said base $f$, and surrounding said coil and the working parts of the solenoid; and a bearing box $j^2$ on said jacket, for said connecting rod $h^2$, substantially as set forth.

20. In an electric steering gear the combination with a steam steering engine, connected with the rudder, and an electric motor, for controlling said engine; of a circuit changer mounted in a closed casing in the bow of the vessel, said circuit changer having a sliding contact arm; and a crank for operating said contact arm, substantially as set forth.

21. In an electric steering gear, the combination with a steam steering engine, connected with the rudder and a plurality of solenoids for controlling said engine; of a circuit changer in the bow of the vessel; a sliding contact arm, in electrical contact with the segments of said circuit changer; a crank for operating said contact arm; circuits from segments of said circuit changer to said solenoids; and a common return circuit from said solenoids to said contact arm, substantially as described.

22. In an electric steering gear, the combination with a steam steering engine connected with the rudder, and an electric motor, for controlling said engine; of a circuit changer in the bow consisting of segments, a contact arm, in electrical contact with said segments; a spring $t$, on the end of said contact arm, and a ring $n$ having notches $t^2$ with which said spring engages, substantially as set forth.

23. In an electric steering gear, the combination with a steam steering engine connected with the rudder, and an electric motor, for controlling said engine; of a circuit changer in the bow of the vessel, consisting of segments, a contact arm $r$, in electrical contact with said segments, a spring $t$, on the end of said contact arm, a ring $n$ having notches $t^2$ with which said spring engages and a crank for operating said contact arm, substantially as set forth.

24. In an electric steering gear, the combination with a steam steering engine connected with the rudder, and an electric motor, for controlling said engine; of a circuit changer in the bow of the vessel, consisting of segments, a shaft $t'$, mounted centrally within said segments, a sleeve $q$, on said shaft, a contact arm $r$ pivoted on said sleeve, a crank for actuating said shaft, a spring $t$ on the end of said contact arm, and a ring $n$ having notches $t^2$ with which said spring engages, substantially as set forth.

25. A circuit changer for the use specified consisting of a casing $l$; and insulated base $m'$, supported therein, carrying the segments of the circuit changer; a shaft $p'$ mounted in said casing; a crank for actuating said shaft; a sleeve $q$ on said shaft, having lugs $q^2$; a contact arm $r$ mounted in said lug; a projection $r'$ on one or both of said lugs; studs $r^2$ on said contact arm, on each side of said projection; springs $s, s$, for the purpose mentioned; a contact piece $u'$ in electrical contact with the segments of the circuit changer; a spring $t$ on the end of said contact arm, carrying a stud $t'$, and a ring $n$, having notches $t^2$, with which said stud $t'$ is adapted to engage, substantially as set forth.

26. In an electric steering gear, the combination with a steam steering engine, connected with and operating the rudder; of a plurality of solenoids controlling said engine, and a circuit changer in the bow of the vessel, said circuit changer consisting of segments divided into as many groups as there are solenoids; each group having an uneven number of segments, more than one; the segments of each group connected together by resistances, but insulated from the segments of the other groups; a circuit, extending from the central segment of each group to a particular solenoid; a contact arm in electrical contact with said segments; and a return circuit or circuits from said solenoids to said contact arm substantially as described.

In testimony whereof I affix my signature in presence of two witnesses.

FRANK L. DYER.

Witnesses:
CLARINE L. MARSHALL,
ANTOINETTE L. SOHON.